United States Patent Office 3,539,397
Patented Nov. 10, 1970

---

3,539,397
FUEL CELL WITH TEMPERATURE CONTROL
Stephen J. Keating, Jr., West Hartford, and Richard D. Sawyer, Canton, Conn., assignors to United Aircraft Corporation, East Hartford, Conn., a corporation of Delaware
Filed May 23, 1967, Ser. No. 640,682
Int. Cl. H01v 27/12
U.S. Cl. 136—86                        4 Claims

ABSTRACT OF THE DISCLOSURE

The average temperature of a fuel cell is maintained essentially constant by providing temperature control over the coolant as it enters the fuel cell in such a fashion that, as the fuel cell current load increases, the coolant inlet temperature is decreased proportionally so as to compensate for coolant output temperature increases as a result of the current load increase and thus waste heat output in a fuel cell. The control over the coolant at the inlet is responsive to the current load of the fuel cell. Temperature control is achieved by regulating the amount of coolant which passes through a module temperature control heat exchanger that is cooled by ambient air, and the amount of coolant which bypasses the heat exchanger.

CROSS-REFERENCE TO RELATED APPLICATIONS

Our copending application entitled Fuel Cell Process Air Control, Ser. No. 640,648, filed on May 23, 1967, discloses and claims the oxygen supply system disclosed herein.

BACKGROUND OF THE INVENTION

Field of invention

This invention relates to fuel cells, and more particularly to the control of temperature therein.

Description of the prior art

A fuel cell of the type with which this invention is concerned produces an electromotive force by bringing an oxidant and a fuel in contact with two suitable electrodes adjacent an electrolyte. A fuel such as gaseous hydrogen is introduced at the anode where it reacts electrochemically with the electrolyte, such as aqueous potassium hydroxide to impart electrons to the anode. Simultaneously an oxidant such as air is introduced to the cathode where it reacts electrochemically with the electrolyte to consume electrons at the cathode. Connecting the two electrodes through an external load circuit causes an electrical current to flow in the circuit and withdraws electrical power from the cell. The overall fuel cell reaction produces electrical energy at a potential which is the sum of the potentials of the separate half cell reactions. As by-products of the reaction, water is formed as well as some heat.

It is also known that numerous fuel cell units are connected together in series-parallel combinations to provide a cell capable of supplying electricity at suitable voltages and currents. Additionally, it is desirable that the cell employ air as the oxidant rather than pure oxygen, both from an economic standpoint and to avoid the need for ancillary equipment for supplying oxygen to the cells. Furthermore, a cell must be capable of operating at relatively extreme ambient temperature ranges and at substantially any air relative humidity.

The use of air and the need to operate over wide temperature and relative humidity ranges produce serious problems. Thus, in the event an aqueous alkali or other carbonate forming electrolyte is used, the carbon dioxide must be removed to prevent fouling of the electrolyte and the overall cell. Furthermore, when ambient air is introduced into a cell either in cold, dry regions or hot, humid regions the proper humidity and operating temperature of the cell cannot be maintained. For example, in cold, dry regions the ambient air draws water from the electrolyte. In cells employing a trapped electrolyte, i.e., where the electrolyte is retained in a matrix, the drying of the matrix can cause a loss in performance due to a shift in the electrolyte-gas interface within the electrodes or damage due to excessive heating. Moreover, water depletion from the electrolyte reduces the efficiency of the cell in that the electrolytic conductivity is lowered and the tendency for gas crossover in the cell is increased. Where the relative humidity is high, the moisture from the cell will build up and can result in electrode flooding.

The voltage output of the cell is, among other things, dependent upon the temperature at which the process is carried on. Previous devices which were used in an attempt to maintain some control over the temperature of the fuel cell reaction required the use of temperature sensors, variable speed pumps and controls therefor, complex air flow arrangements, and other complex equipment. Furthermore, attempts to control process temperature in direct response to the temperature of the process results in a dynamic response problem which relates to time lags in the change in temperature in the coolant which results from a change in temperature in the system, and vice versa. The dynamic response problem becomes worse with fuel cells of higher output capacity due to additional thermal lags resulting from the mass of the system and the transport times involved therein.

SUMMARY OF THE INVENTION

An object of the present invention is to provide a substantially constant voltage at the output of a fuel cell over a range of fuel cell load currents.

Another object of the invention is to provide improved control over the temperature at which the process in a fuel cell is carried out.

According to the present invention, the increase in waste heat generated with increasing output loads in a fuel cell is compensated for by supplying coolant at a lower temperature at the coolant inlet to the fuel cell reaction, whereby the outlet temperature may increase with increasing load, but the average temperature of the fuel cell remains a constant, thus tending to stabilize the output voltage which is temperature dependent.

In further accord with the present invention, the temperature of the coolant at the inlet to the fuel cell is controlled directly in response to fuel cell load current.

In still further accord with the present invention, the controlling of the coolant at the inlet to the fuel cell is accomplished by mixing proper amount of coolant passed through a heat exchanger capable of lowering the temperature of the coolant and warmer coolant which is by-passed around the heat exchanger.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
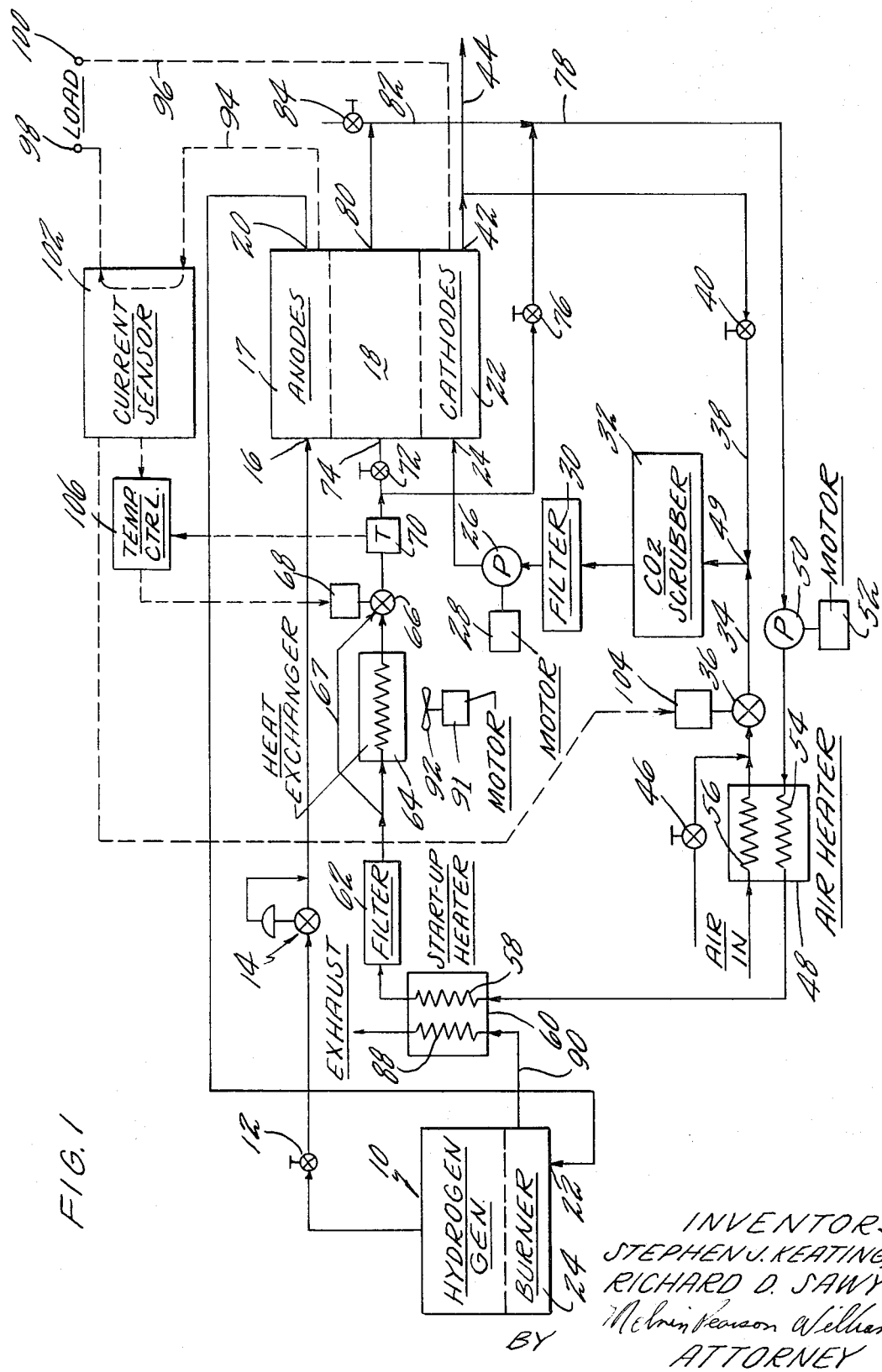
FIG. 1 is a semipictorial schematic diagram of a fuel cell powerplant system incorporating the present invention.

A hydrogen generator 10 supplies pure hydrogen ($H_2$) to a valve 12 which permits closing the hydrogen line prior to obtaining hydrogen generation on startup; and thence to a pressure regulator 14 which maintains the pressure of the hydrogen in a fuel cell near atmospheric pressure, such as between 1–2 lbs. per square inch. The hydrogen line connects to an inlet 16 of a fuel cell 18 so as to permit the hydrogen to pass over the anode 17 (or anodes) of the fuel cell so as to supply electrons to the electrical generating process. The vented hydrogen is passed from an outlet 20 of the fuel cell to an inlet 22 of a burner 24 which is part of a hydrogen generator 10. A small percentage of hydrogen is continuously vented to carry off inerts which might otherwise cause impaired fuel cell performance. As is known in the art, the hydrogen generator 10 may burn the waste products of the hydrogen generation process so as to supply heat used in the process; as a matter of economy, the vented hydrogen may be passed from the outlet 20 of the fuel cell 18 to the burner 24 so as to utilize the waste hydrogen in the burning process along with the waste products of the hydrogen generator. This is not, however, important to the present invention.

Oxygen is supplied to the cathode or cathodes 22 of the fuel cell 18 at an inlet 24 from a constant volume output pump 26 which may be driven by a suitable constant speed motor 28. In certain environments, power for the motor 28 (and for other motors illustrated herein) may be supplied by the fuel cell itself. The pump 26 receives air from an inlet line including a filter 30 and a conventional $CO_2$ scrubber 32. Air is supplied to the inlet of the scrubber 32 from an atmospheric line 34 which includes a controlled valve 36, and from a recirculating line 38 which includes a trim valve 40. The recirculating line 38 carries a portion of the depleted air from an outlet 42 of the fuel cell 18, the portion of air not drawn through the recirculating line 38 being vented to atmosphere by a line 44. The atmospheric air supplied to the controlled valve means 36 may be raw atmospheric air drawn through a trim valve 46 and heated air drawn through an air heater 48 in a mixture proportioned to give the correct mix temperature and thus the correct relative humidity at the scrubber inlet 49.

In order to control the temperature of the process, and therefore, the voltage output of the fuel cell 18, a coolant line for the system includes a constant volume output pump 50 (bottom of FIG. 1) which is driven by a constant speed motor 52. The pump 50 supplies coolant, which may be an aqueous solution of ethylene glycol, or a synthetic fluid such as silicone oil to a heat source portion 54 of the air heater 48 so that heat will be transferred from the coolant to a heat sink portion 56 through which atmospheric air is passed. This permits heating atmospheric air by some amount so that through adjustment of the valve 46, the atmospheric air input to the controlled valve means 36 will be at some suitably warm temperature. The trim valve 46 may be adjusted in accordance with the average ambient temperature, being nearly closed when the atmosphere is cold, and being opened more fully when the outside air is warm. Coolant flows from the air heater 48 to a heat sink portion 58 of a startup heater 60, and thence to a conventional filter 62. From the filter 62, the coolant may flow through a temperature control heat exchanger 64 to a temperature control valve 66, or may flow through a bypass line 67 directly to the temperature control valve 66. The temperature control valve 66 includes an operating mechanism 68 for regulating the proportion of coolant which is cooled by the heat exchanger 64 in the total supply of coolant passed through a temperature sensor 70 and a trim valve 72 to a coolant inlet 74 at the fuel cell 18. Instead of flowing into the inlet 74 through the trim valve 72, a certain portion of the coolant may flow through a trim valve 76 to a return line 78 which supplies coolant to the pump 50. The return line 78 is also fed from a coolant outlet 80 of the fuel cell 18 over an exit line 82 which may include an air bleed valve 84 located at a high point on the coolant line.

The startup heater 60 has a heat source portion 88 which is in the exhaust line 90 of the burner 24 of the hydrogen generator 10. This utilizes heat from the burner 24 to warm up the coolant for the fuel cell 18. The heater 60 is advantageous during the process of starting up the fuel cell powerplant, so that when hydrogen is available from the hydrogen generator 10, and the hydrogen input valve 12 may be opened, the coolant will have already established a nominal operating temperature whereby steady-state operation may be achieved much more quickly in the fuel cell 18. The use of the startup heater 60 provides rapid establishment of steady state operating conditions without the need for a special heater or the consumption of any additional fuel. Heating the coolant by means of the hydrogen generator exhaust 88, 90 is also advantageous because at idle temperatures, and even at part load in very cold ambients, there is not enough waste heat generated as a result of the process in the fuel cell 18 to keep the heat up to a level where it can be controlled to a proper temperature by cooling in the module temperature control heat exchanger 64, so as to achieve a constant voltage output. Heat is supplied by the exhaust 88, 90 at all times, but when it is not necessary, it is removed by the heat exchanger 64 and becomes waste heat out of the heat exchanger 64 instead of out of the exhaust 90 of the hydrogen generator 10.

The heat exchanger 64 may include a suitable motor 91 for driving a fan 92. Since the bypass line 67 together with the bypass control valve 66 will regulate the temperature of the coolant passing to the inlet 74 of the fuel cell 18, the motor 91 may be a constant speed type, and no controls are needed therefor.

Figure 2:
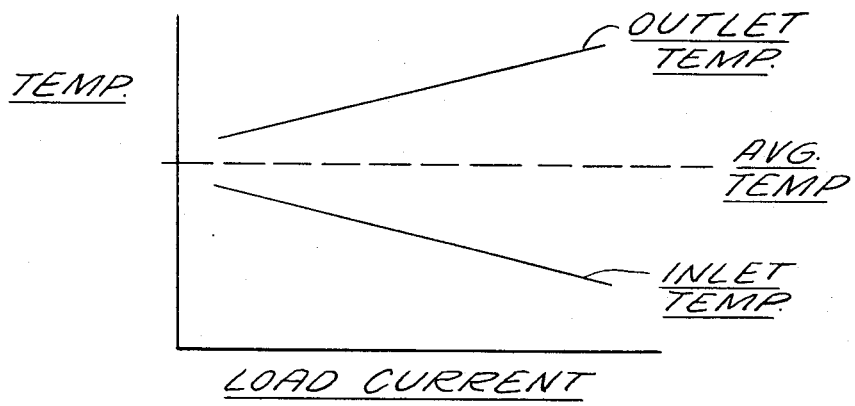
FIG. 2 is an illustration of temperature in the fuel cell plotted as a function of load current.

The electrical output of the fuel cell is connected by a pair of electrical lines 94, 96 to corresponding load terminals 98, 100. The line 94 passes through a current sensor 102 so as to continuously provide a manifestation of the magnitude of load current output from the fuel cell powerplant. The current sensor 102 may include a shunt (that is, a low-valued series resistance) placed in series in the line 94, or may include other suitable current responsive means. The current sensor will supply an electrical signal, the magnitude of which is dependent upon the magnitude of load current in the lines 94, 96, to a control 104 (bottom of FIG. 1) which operates the controlled valve 36. The current sensor also provides a load indicating signal to a temperature control unit 106, which unit is also responsive to the temperature sensor 70 that provides an indication of the actual temperature of the coolant at the inlet 74 of the fuel cell 18. The temperature controller 106 in turn provides a signal to the control unit 68 of the bypass control valve 66, which signal is a combined function of load current and actual temperature of the coolant, as described more fully hereinafter. The primary objective of apparatus in accordance with the present invention is provision of a substantially constant voltage across the load terminals 98, 100 over a wide range of load currents and ambient temperatures and humidities. The fuel cell output voltage is dependent upon the temperature at which the process proceeds, and the temperature across the cell increases with increasing load, and therefore, in order to achieve an output voltage which is as nearly constant as possible over varying load conditions, the coolant system herein is designed to schedule the average temperature within the fuel cell to be as nearly constant as possible for varying load conditions. As is illustrated in FIG. 2, average temperature is defined herein as the average between the exit temperature and inlet temperature (which equals the sum of the inlet and outlet temperatures divided by two). In order to maintain the average temperature in the fuel cell constant for increasing loads, the bypass control valve 66 adjusts the proportion of coolant passed through the bypass line 67 and the proportion of coolant passed through the heat exchanger 64 so as to provide a proper temperature at the inlet 74 of the fuel cell. The bypass control valve 66 is responsive to the temperature controller 106 in such a fashion that as output load current increases, and the fuel cell exit temperature automatically increases as a result of the process, the inlet temperature is decreased so that the average temperature of the fuel cell remains essentially constant as shown in FIG. 2.

The temperature of the coolant is going to vary in accordance with the action of the module temperature control heat exchanger, the bypass valve 66 being excluded from consideratiton, that is, even if the bypass valve remained fixed, the temperature at the temperature sensor, which is also the inlet temperature of the coolant into the fuel cell, will vary not only in accordance with the process being carried on in the module, but also as a function of the ambient air being blown through the heat exchanger 67 so as to maintain temperature control. Therefore, there are two variables that are unknowns and the feedback from the temperature sensor 70 is necessary in order to acquire the proper temperature. The current sensor 102 indicates the desired temperature, and the temperature sensor 70 indicates the existing temperature. By comparing them, the temperature controller 106 provides a signal to adjust the valve 66 to either raise or lower the coolant flow through the heat exchanger 64 until such time as the difference is so minimal that the system doesn't respond to it. This may be done by providing an electrical voltage from the temperature sensor, and an inverted electrical voltage from the current shunt, feeding them to summing resistors in an amplifier which drives a solenoid in the actuator 68 to operate the valve 66. The valve 66 may have a gate shaped to provide the type of control and feedback response that is required. This is an exemplary simple method, although other methods may be used.

Many things can effect the output voltage of the fuel cell, including temperature, the volume of the electrolyte in the cell, the age of the cells, as well as the partial pressure of the reactants in the cells. Therefore, the oxygen supply of a fuel cell should be so controlled as to mitigate the oxygen demand effects on the output voltage.

Figure 3:
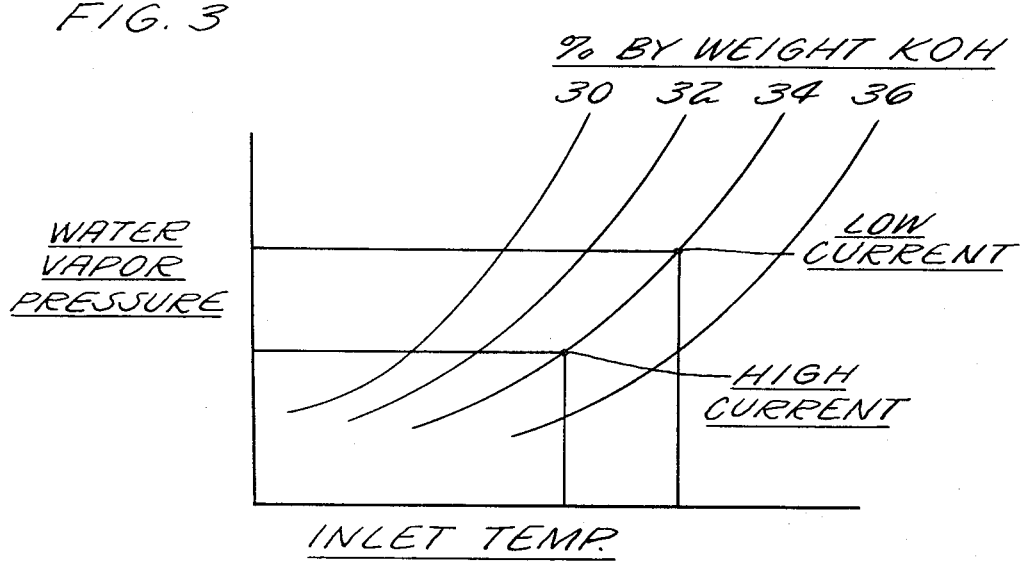
FIG. 3 is an illustration of water vapor pressure of the process air as a function of temperature, plotted for various electrolyte concentrations.

Another characteristic of a fuel cell is excursions in electrolyte concentration as a function of temperature variations across the cell. As is known in the art, the voltage output of the fuel cells is dependent upon the volume of aqueous KOH (potassium hydroxide) electrolyte which is within the cell. In order to maintain a constant voltage output, or as nearly thereto as possible, at varying loads, the effect of temperature variations as a function of current load on the fuel cell must be taken into account in order to preserve the constant volume of KOH electrolyte. The electrolyte is an aqueous solution of KOH, the remainder being water. The percent by weight of KOH in the electrolyte is a function of the temperature and water vapor pressure in the air passing over the electrolyte, in accordance with the relationship set forth in FIG. 3. As described hereinbefore when the waste heat output increases with an increasing load, in order to maintain a relatively constant average temperature across the fuel cell, the apparatus described hereinbefore provides a lower inlet temperature by lowering the temperature of the coolant as it enters the fuel cell. Therefore, as output load increases, the inlet temperature decreases, and it is desirable to cause a corresponding decrease in water vapor pressure so as to maintain a constant concentration of KOH (that is, to stay on the same KOH curve as seen in FIG. 3).

As is well known in the art, the $CO_2$ scrubber 32 may comprise soda lime, which is effective in removing carbon dioxide from the air when it is maintained at a proper relative humidity. By proper adjustment of the valve 46 (so as to supply atmospheric air at a correct temperature), and by a proper initial adjustment of the trim valve 40 so that a correct nominal mixture of recirculating air (which is wet and hot) with atmospheric air (which is cooler and drier), a substantially constant proper relative humidity can be maintained in the air at the mix point 49 of the air at the input to the $CO_2$ scrubber 32, as the proportions of recirculated air and atmospheric air are adjusted by the controllable valve 36.

Thus, the dynamic temperature, absolute humidity and oxygen requirements of the process, as well as the relative humidity requirement of the $CO_2$ scrubber are all accommodated by the air control means in accordance with the invention herein.

The balance between atmospheric air and recirculating air is maintained so that the higher oxygen content of the atmospheric air is available in order to sustain an increased process reaction. This is not achieved by varying the amount of oxygen at the inlets, or the flow rate of air in the pump nor even by directly regulating the amount of recirculated air. Instead, the constant volume output pump 26 will pump approximately the same amount of air at all times, the proportion of the air which comes from the recirculation line 38 a function of the trim valve 40 and the dynamically controlled adjustment of the back pressure on the atmospheric air created by the controlled valve 36. Thus, when the valve 36 is relatively closed, the constant volume pump will draw more air from the recirculation line 38, and less of the depleted exhaust air from the outlet 42 will pass through the exhaust 44. On the other hand, by opening the valve 36, more air will pass from the atmosphere, so the constant volume pump will draw less air through the recirculating line 38, and a greater amount of expended air is passed through the exhaust 44. (Note that the fuel cell powerplant herein is described as if it were comprised of a single cell, but as is well known in the art, it may comprise a plurality of cells connected in series so as to produce a sufficient voltage, much like so many cells connected serially for a twelve-volt battery.) Of course, a voltage output requiring a number of cells in series could be comprised of just that number of cells in series, or double that number arranged in two parallel groups, so as to provide a higher maximum current capacity. Similarly, even more parallel groups of cells could be provided for the current loads that are desired.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which we claim as new and desire to secure by Letters Patent of the United States is:

1. In a fuel cell power plant capable of delivering electrical current to a load including a temperature control, the improvement in coolant control comprising:

means for sensing the magnitude of load current being delivered by the fuel cell power plant;
  a temperature sensor for sensing the temperature of the coolant supplied to the fuel cell power plant; and
  means responsive to said current sensor and to said temperature sensor which permits adjusting the temperature of coolant supplied to said fuel cell in response to the current load being delivered by the fuel cell power plant.

2. In a fuel cell capable of delivering electrical current to a load including means for providing coolant to the fuel cell, the improvement in coolant control comprising:

means for sensing the magnitude of the electric generating process in the fuel cell;

a temperature sensor disposed at the coolant inlet to the fuel cell for sensing the temperature of the coolant supplied to the fuel cell; and means responsive to said process sensor and to said temperature sensor which permits adjusting the temperature of the coolant supplied to the inlet of said fuel cell in response to the magnitude of the process in the fuel cell, whereby thermal lag in the coolant control is avoided.

3. A fuel cell power plant capable of delivering current to a load having a temperature control comprising:

a coolant circuit through which cooling fluid is driven by a constant volume output pump, said coolant circuit supplying coolant to an inlet of said fuel cell and receiving coolant for recirculation at an outlet of said fuel cell;

said coolant circuit also including a temperature control heat exchanger for lowering the temperature of said coolant, a bypass circuit for bypassing fluid around said heat exchanger and a mixing valve, said mixing valve controllable to regulate the proportion of coolant flowing into the inlet of the fuel cell which passes through said temperature control heat exchanger;

said coolant circuit further including a temperature sensor between said mixing valve and the coolant inlet to the fuel cell;

means for sensing the magnitude of current being delivered to the load by the fuel cell power plant; and control means responsive to said current sensor and to said temperature sensor for adjusting the setting of said mixing valve.

4. The apparatus according to claim 3 wherein said control means includes means to provide a valve control signal for adjusting the setting of said mixing valve so as to provide a greater proportion of bypass coolant to said inlet in response to greater current loads, whereby the temperature of coolant supplied to the inlet of the fuel cell is inversely proportional to the current load delivered by the fuel cell power plant.

References Cited

UNITED STATES PATENTS

| 2,980,749 | 4/1961 | Broers | 136—86 |
| 3,141,796 | 7/1964 | Fay et al. | 136—86 |
| 3,146,131 | 8/1964 | Linden et al. | 136—86 |
| 3,150,657 | 9/1964 | Shultz et al. | 136—86 X |
| 3,300,341 | 1/1967 | Gregory et al. | 136—86 |
| 3,352,716 | 11/1967 | Lindstrom | 136—86 |
| 3,379,572 | 4/1968 | Gay | 136—86 |
| 3,239,383 | 3/1966 | Hauel | 136—86 |
| 3,411,951 | 11/1968 | Gelting. | |

ALLEN B. CURTIS, Primary Examiner